Dec. 5, 1944.  J. N. DOW ET AL  2,364,134
SHOE SOLE
Filed Oct. 2, 1943

INVENTORS
James N. Dow
BY Ara J. Dildilian
Rowland V. Patrick
ATTORNEY

Patented Dec. 5, 1944

2,364,134

UNITED STATES PATENT OFFICE 2,364,134

SHOE SOLE

James N. Dow, Longmeadow, Mass., and Ara T. Dildilian, Suffield, Conn., assignors to Bigelow-Sanford Carpet Co., Inc., Thompsonville, Conn., a corporation of Massachusetts Application October 2, 1943, Serial No. 504,728

6 Claims. (Cl. 28—80)

Our invention relates to soles for footwear.

The object of the invention is to provide such a sole which will be a satisfactory substitute for soles of leather or of other known materials.

Various efforts have been made to combine a fabric, or layers of fabric, with thermoplastic and other resinous materials to provide shoe soles but, so far as we are aware, such shoe soles have not been commercially satisfactory because of their lack of durability and because of the expense of such materials employed.

We have discovered that these objections are overcome by a single sheet of a special sort of fabric which is filled on at least one side by plastic material applied thereto and may be impregnated with a highly concentrated lacquer or varnish. This fabric is preferably a woven fabric which is formed of sets of weft and sets of warp threads, some of the latter being of comparatively light weight, but at least one of the sets of warps being of comparatively heavy strong yarns or cords having nubs formed of loops which protrude at least on the side of the fabric which is to form the tread of the sole. The protruding nubs are so spaced relatively to one another both warpwise and weftwise that adjacent nubs are preferably slightly separated from one another or contact with one another only lightly. This spacing provides interspaces into which the plastic material is forced so that the material fills the spaces, covers the nubs and may impregnate some or all of the threads of the fabric. The nubs of heavy yarn, projecting into the plastic material, anchor the plastic material firmly in place to and on the fabric and constitute a very substantial portion of the material on the tread side of the fabric so that the amount of the plastic material needed in the sole is greatly reduced, and expense saved, compared to the amount of plastic material which would be necessary to make a sole of the same thickness without such nubs. The combination of the nubs and the plastic material on the tread side of the sole provides a durable wear-resisting layer of material which we have found to equal leather in this and other qualities. The material of the tread layer, composed of the nubs and the plastic on the bottom of the sole, provides a substantial thickness which can be worn away in use without injury to the other threads of the fabric which provide the necessary strength in all directions laterally even when the tread layer is worn away in use.

Figure 1:
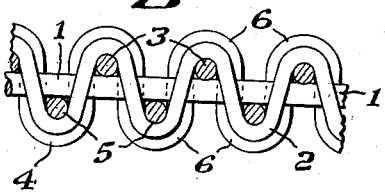
Fig. 1 is an enlarged cross-section of a fabric.

The fabric of the sole is woven with a set of warps 1, a set of warps 2 and two sets of wefts 3 and 5, one above and the other under the warps 1, and with a set of comparatively heavy strong warp yarns or cords 4, of which loops protrude to form nubs 6 on both sides of the fabric.

Figure 2:
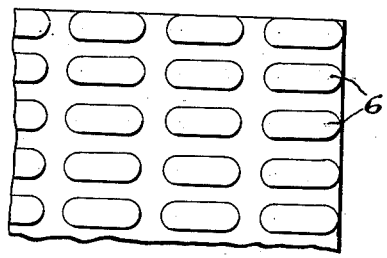
Fig. 2 is a view of one side of the fabric of Fig. 1.

The yarns 4 are stout cotton cords, preferably substantially heavier than the other threads, which may also be of cotton. We prefer to use a high quality cotton cord as the yarns 4 with eight to eleven courses and rows per inch so that the nubs formed by the loops of the cords are preferably spaced from one another both warpwise and weftwise as shown in Fig. 2.

The plastic material 8 is applied on both sides of the fabric, Figs. 1–4, either as sheets or in a solvent. The assembly of fabric and of plastic material is united by heat and pressure to form a compacted finished sheet. This may be done either on a hydraulic press operating on a stack of sheets or on a continuous cylindrical press operating on a continuous sheet. The plastic material is forced into the spaces between the protruding nubs 6 of the yarns 4 and into the bights of the nubs and may penetrate and impregnate the entire fabric. If desired, the wefts or the warps 1 or 2, or all of them, may be impregnated, preparatory to insertion in the loom or to weaving, with a plastic material, which unites with the plastic material with which the fabric is impregnated. The plastic materials on the two sides of the fabric may be the same or different.

Soles may be cut from the sheet in any desired way.

In the finished sole the nubs of yarn 4 anchor the layers of plastic material to the fabric and form a substantial part of the composite layers of nubs and plastic material so that a substantial saving is made in the amount of the plastic material needed for a sole of a given thickness. The composite tread layer of the nubs of the heavy warps and of the plastic material may be worn away before exposing the other threads of the fabric which suffice in themselves to afford the necessary lateral strength to the sole.

Figure 3:
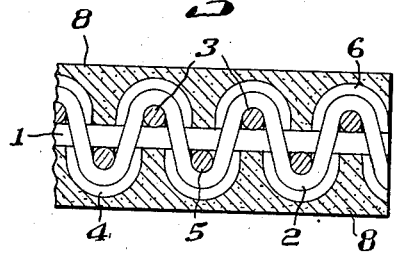
Fig. 3 is a cross-section of a completed shoe sole.

The sole shown in Fig. 3 is a shoe sole in which the cords 4 are heavy cords of which the nubs formed by the loops may protrude equally on both sides of the fabric. In this example the same kind of plastic material may be applied to both sides of the fabric although different kinds of plastic materials may be used on each side. The compressed finished sole is preferably from .150 to .210 inch thick. Such a sole may be attached to a shoe upper by stitching.

Figure 4:
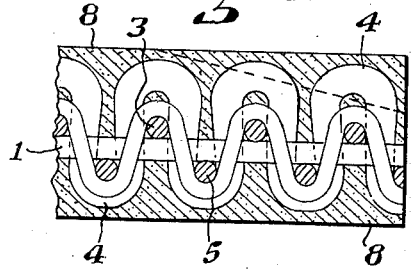
Fig. 4 is a cross-section of a modification of a shoe sole.

Soles made in accordance with our invention are also adapted to be cemented to uppers where, as in the case of cemented women's shoes, it is customary and desirable to skive off a substantial part of the edge portion of the sole along the shank to improve the appearance of the shoe. In the modification shown in Fig. 4, the loops of the heavy warp yarns are formed so that the nubs formed thereby protrude more on the upper side of the sole than on the tread side. The skiving, on the dotted line, may cut away the upper layer of the plastic material and nubs of heavy warp yarn 4 without cutting the other threads of the fabric so that the sole is not weakened and there can be no ravelling of those threads. As shown in Fig. 4, 40% or more of the sole edge may be skived from the upper side, in accordance with usual shoemaker's practice, without cutting any threads except the heavy warps 4.

We have found that one of the "Vinylite" resins, a copolymer of vinyl chloride and vinyl acetate, is a most satisfactory plastic material because of its characteristics of toughness and elasticity. Our invention is not confined to the use of this particular type of plastic material, but includes such plastic materials as cellulose acetate, cellulose nitrate, natural and synthetic rubbers. Our invention also includes the use of other thermoplastic, thermosetting or solvent-plastic materials having similar physical characteristics, particularly as to elasticity and toughness.

In soles to be cemented to uppers, Fig. 4, we prefer to use nitrocellulose as the plastic material on the upper side of the sole, as this material readily unites with the nitrocellulose cements commonly used for cementing shoe soles to uppers in women's shoes. The tread side of the sole may be provided with the Vinylite resin or any other suitable material in the manner above described. We have found it desirable first to apply the Vinylite resin to the tread side and then, before applying the nitro-cellulose to the upper side, to restore the nubs on the upper side to their original state of protuberance such as by steaming the fabric as they may have been somewhat flattened by the pressing operation in applying the "Vinylite" resin to the tread side of the sole.

Figure 5:
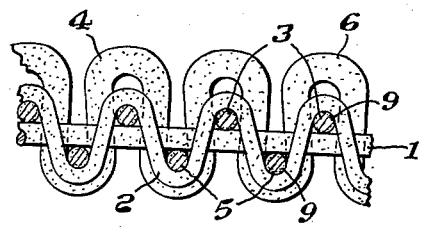
Figs. 5 and 6 are respectively a cross-section of another modification of the fabric, and of a completed shoe sole made from that fabric.
Figure 6:
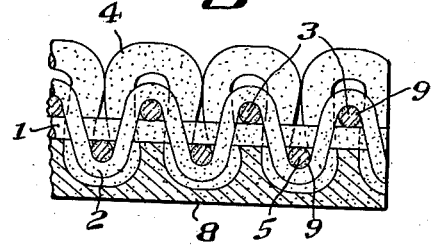

The fabric shown in Fig. 5 is adapted for the sole of a woman's shoe. In this modification the weft threads 3 and 5 are preferably coated with the plastic material 9 before weaving and the loops on the upper side are higher than on the tread side. All the threads of the fabric are impregnated with a highly concentrated lacquer or varnish before the application of the plastic material which, in this case, is on the tread side only. When the assembly is squeezed together the pressure employed slightly flattens the nubs on the non-tread side, Fig. 6.

Figure 7:
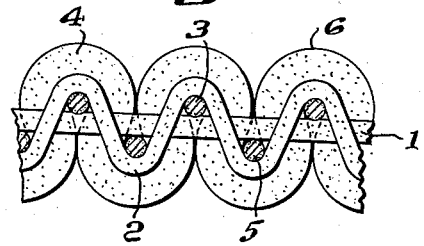
Figs. 7 and 8 are respectively cross-sections of another modification of the fabric and of the completed shoe sole made therefrom.
Figure 8:
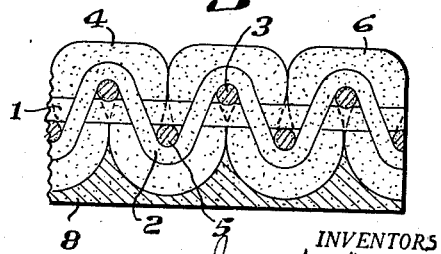

The fabric shown in Fig. 7 has heavier cords 4 than the corresponding cords in Fig. 5 and has nubs of the same height on both sides of the fabric. In proportion to the nubs there is less plastic material used, Fig. 8, than in the sole of Fig. 6. This is an example of a man's shoe sole.

We claim:

1. A shoe sole composition comprising a fabric having sets of warps and wefts of normal size and weight constituting the backing portion of the fabric and another set of warps consisting of abnormally heavy and strong yarn, compared to the yarns of the sets of warps and wefts in said backing portion, forming separate uncut erect nubs protruding on both faces of the fabric, the portions of said heavy yarns extending through and at substantially right angles to said backing portion being so heavy and strong as to be uncrushed in said composition, tough elastic plastic material filling the spaces between and covering the nubs on one face of the fabric and a different plastic material on the other face of the fabric filling the spaces between the nubs and capable of forming a strong bond with nitrocellulose cement.

2. A shoe sole composition comprising a fabric having sets of warps and wefts of normal size and weight constituting the backing portion of the fabric and another set of warps consisting of abnormally heavy and strong yarn, compared to the yarns of the sets of warps and wefts in said backing portion, forming separate uncut erect nubs protruding on both faces of the fabric, the portions of said heavy yarns extending through and at substantially right angles to said backing portion being so heavy and strong as to be uncrushed in said composition, and plastic material filling the spaces between and covering the nubs on one face of the fabric, said plastic material having properties of elasticity and toughness similar to those of a copolymer of vinyl chloride and vinyl acetate.

3. A shoe sole composition comprising a fabric having sets of warps and wefts of normal size and weight constituting the backing portion of the fabric and another set of warps consisting of abnormally heavy and strong yarn, compared to the yarns of the sets of warps and wefts in said backing portion, forming separate uncut erect nubs protruding on both faces of the fabric, the portions of said heavy yarns extending through and at substantially right angles to the backing portion of the fabric being so heavy as to be uncrushed in said composition, and plastic material filling the spaces between and covering the nubs on one face of the fabric, said plastic material comprising a copolymer of vinyl chloride and vinyl acetate.

4. A shoe sole composition comprising a fabric having sets of warps and wefts of normal size and weight constituting the backing portion of the fabric and another set of warps consisting of abnormally heavy and strong yarn, compared to the yarns of the sets of warps and wefts in said backing portion, forming separate uncut erect nubs protruding on both faces of the fabric, but protruding more on one face than on the other, the portions of said heavy yarns extending through and at substantially right angles to the backing portion of the fabric being so heavy and strong as to be uncrushed in said composition, tough elastic plastic material filling the spaces between and covering the nubs on one face of the fabric and a different plastic material capable of forming a strong bond with nitrocellulose cement on the other face of the fabric on which the nubs protrude the farther and filling the spaces between and covering the nubs, thereby providing more material to be cut away from said face than from the other face without cutting the warps and wefts of the backing portion of the fabric.

5. A shoe sole composition comprising a fabric having sets of warps and wefts of normal size and weight constituting the backing portion of the fabric and another set of warps consisting of abnormally heavy and strong yarn compared to the yarns of the sets of warps and wefts in said backing portion and forming separate uncut erect nubs protruding on both faces of the fabric, the portions of said heavy yarn extending through and at substantially right angles to the backing portion of the fabric being so heavy and strong as to be uncrushed in said composition, a plastic material filling the spaces between and covering the nubs on each face of the fabric and a plastic material impregnating at least some of the sets of the yarns of said backing fabric, said yarn impregnating plastic being united with the plastic material on a face of the fabric.

6. A shoe sole composition comprising a fabric having sets of warps and wefts of normal size and weight constituting the backing portion of the fabric and another set of warps consisting of abnormally heavy and strong yarn compared to the yarns of the sets of warps and wefts in said backing portion and forming separate uncut erect nubs protruding on both faces of the fabric, the portions of said heavy yarns extending through and at substantially right angles to the backing portion of the fabric being so heavy and strong as to be uncrushed in said composition, a plastic material comprising a copolymer of vinyl chloride and vinyl acetate filling the spaces between and covering the nubs on one face of the fabric, a plastic material comprising nitrocellulose filling the spaces between and covering the nubs on the other faces of the fabric, and a plastic material impregnating at least some of the sets of the yarns of said backing fabric, said yarn impregnating plastic being united with the plastic material on the faces of the fabric.

JAMES N. DOW.
ARA T. DILDILIAN.